United States Patent
Danet et al.

(10) Patent No.: US 7,263,872 B2
(45) Date of Patent: Sep. 4, 2007

(54) METHOD FOR DETERMINING THE ENERGY OF A KNOCK SIGNAL FOR AN INTERNAL COMBUSTION ENGINE

(75) Inventors: Bertrand Danet, Toulouse (FR); Frédéric Galtier, Montpellier (FR); Jérome Trescazes, Latoue (FR)

(73) Assignee: Siemens VDO Automotive, Toulouse Cedex (FR)

( * ) Notice: Subject to any disclaimer, the term of this patent is extended or adjusted under 35 U.S.C. 154(b) by 0 days.

(21) Appl. No.: 10/556,034

(22) PCT Filed: Apr. 30, 2004

(86) PCT No.: PCT/EP2004/004593

§ 371 (c)(1), (2), (4) Date: Feb. 27, 2006

(87) PCT Pub. No.: WO2004/099750

PCT Pub. Date: Nov. 18, 2004

(65) Prior Publication Data
US 2007/0000306 A1    Jan. 4, 2007

(30) Foreign Application Priority Data
May 9, 2003    (FR) .................................. 03 05609

(51) Int. Cl.
*G01L 23/22* (2006.01)
(52) U.S. Cl. ................. 73/35.04; 123/406.16
(58) Field of Classification Search .............. 73/35.04, 73/35.05, 35.01, 35.03, 35.06; 701/111; 123/406.16, 406.21, 406.35, 406.37, 406.38, 123/406.29
See application file for complete search history.

(56) References Cited

U.S. PATENT DOCUMENTS

| | | | |
|---|---|---|---|
| 4,481,924 A | 11/1984 | Kobayashi | |
| 4,593,553 A | 6/1986 | Bonitz et al. | |
| 4,896,639 A * | 1/1990 | Holmes | 123/406.24 |
| 4,967,710 A * | 11/1990 | Komurasaki et al. | 123/406.16 |
| 5,400,644 A | 3/1995 | Remboski, Jr. et al. | |

FOREIGN PATENT DOCUMENTS

| | | |
|---|---|---|
| DE | 31 45 294 | 6/1983 |
| DE | 195 49 175 | 7/1997 |
| FR | 2 571 141 | 4/1986 |

\* cited by examiner

*Primary Examiner*—Helen C. Kwok
(74) *Attorney, Agent, or Firm*—Young & Thompson

(57) ABSTRACT

The invention relates to a method for determining the energy (KNKE) of the knock of an internal combustion engine, using an analog signal supplied by a sensor fixed to the engine. The inventive method includes the following steps: a) the analog signal is shaped, b) the analog signal is converted into a sequence of digital samples, c) the signal is subjected to digital filtering, and d) the signal is adjusted and e) integrated. According to the method: i) the shaping of the analog signal includes combining the signal with a continuous component (Vcnf) adapted to render the shaped signal a positive signal or a zero signal, and ii) the digital filtering is carried out by a band-pass filter with an infinite impulse response, the transfer function thereof including a zero for the zero frequencies.

9 Claims, 2 Drawing Sheets

METHOD FOR DETERMINING THE ENERGY OF A KNOCK SIGNAL FOR AN INTERNAL COMBUSTION ENGINE

FIELD OF THE INVENTION

The present invention relates to a method for determining the energy of a knock signal for internal combustion engine, and more particularly, to such a method calling on calculation means that are essentially digital.

BACKGROUND OF THE INVENTION

For the control of internal combustion engines, it is common to call on the determination of the energy of a signal that is representative of the engine knock, an analog signal produced for example by an accelerometer sensor mounted on the engine, so as to be able to act on control parameters such as, in particular, the spark advance position. For a long time, this energy has been determined by analog means, by filtering the signal from the sensor both using a time window within which the knock is likely to be produced (FR-2 571 141) and within a range of frequencies for the signal characteristic of this knock phenomenon, then by rectifying and integrating this filtered signal.

With the arrival of powerful digital processors on the market, new, essentially digital, methods have been developed.

From the prior art, for example from the document U.S. Pat. No. 5,400,644, an engine knock detection method is known in which the energy of the signal from the sensor is analyzed according to a first frequency spectrum assumed to be that of the knock and according to a second spectrum that is representative of the engine noise, and the presence of the engine knock is deduced from the comparison of these energies.

SUMMARY OF THE INVENTION

The aim of the invention is to propose a simpler, inexpensive solution that offers an improved detection of the engine knock. For this purpose, the method according to the invention comprises the following steps:
a) conditioning of the analog signal,
b) conversion of said analog signal into a sequence of digital samples,
c) digital filtering,
d) rectification and
e) integration of the signal, in which method:
i) the conditioning of the analog signal comprises the addition of said signal with a DC component designed to render said conditioned signal positive or zero,
ii) the digital filtering is carried out by means of a bandpass filter with infinite impulse response whose transfer function comprises a zero for frequencies of zero.

Obtaining a positive signal before conversion is advantageous for the conversion of the analog signal into a digital signal. The fact that this is obtained by adding a DC component allows the spectral characteristics of the signal delivered by the accelerometer to be conserved. In addition, it is simple and inexpensive. The infinite impulse response filter allows a good discrimination of the engine knock to be obtained by taking into account the particular characteristics of each engine and, as the case may be, of its evolutions. In addition, it takes the form of a linear equation, which allows the calculations to be simplified.

In order to further improve the detection of the presence of engine knock, according to a complementary advantageous feature, the conditioning of the analog signal also comprises an open-loop amplification of said signal with an analog gain determined as a function of the rotation speed of the engine.

This solution constitutes a means that is simple, robust and easily implemented for obtaining a signal lying within the optimum range of operation of the analog-digital converter.

Preferably, the conditioning of the analog signal also comprises an anti-aliasing filter, in order to avoid the conversion of the analog signal into a digital signal substantially affecting the characteristics of the signal.

According to another feature of the invention, the bandpass filter is in the form of a programmable biquadratic cell whose central frequency is defined as a function of the operating conditions of the engine.

The implementation as a biquadratic cell limits the number of memory registers required for the filtering and simplifies the calculations. Since the range of frequencies within which the information relating to the presence of engine knock varies as a function of the operating conditions of the engine, by adapting the central frequency of the filter as a function of these conditions, the determination of the presence of engine knock is thus improved.

In addition, according to the invention, the digital implementation of the bandpass filter is carried out by a two-step recursive expression, the first step leading to an intermediate variable representative of the calculation of the zeros of the filter, the second providing the calculation of the poles. Thus, the same memory registers of the microprocessor can be used for the calculation of the zeros then for the calculation of the poles, such that the number of memory registers is halved. It is also possible to directly eliminate the DC component artificially added to the original signal.

According to another advantageous feature of the invention, the bandpass filter coefficients (or any other parameter appearing in the method according to the invention) are taken from a table that was precalculated as a function of the operating conditions of the engine. Thus, performing additional calculations for determining the coefficients is avoided.

In addition, the sign is advantageously determined by a bit of the register such that the rectification step is carried out by elimination of a sign bit from a register containing the last filtered sample of the signal.

According to another advantageous feature of the invention, the integration step is performed by means of a constant-phase digital integrator. Thus, the integrity of the signal frequency information, which forms an essential element in the determination of the presence of engine knock, is conserved.

For this purpose, the implementation of the integrator is advantageously carried out by a discrete summation of the filtered and rectified samples, to which the value of said sum at the penultimate sample is added.

BRIEF DESCRIPTION OF THE DRAWINGS

The invention will become even more clearly apparent in the description that follows, given with reference to the appended drawings, in which.

DETAILED DESCRIPTION OF THE INVENTION

Figure 1:
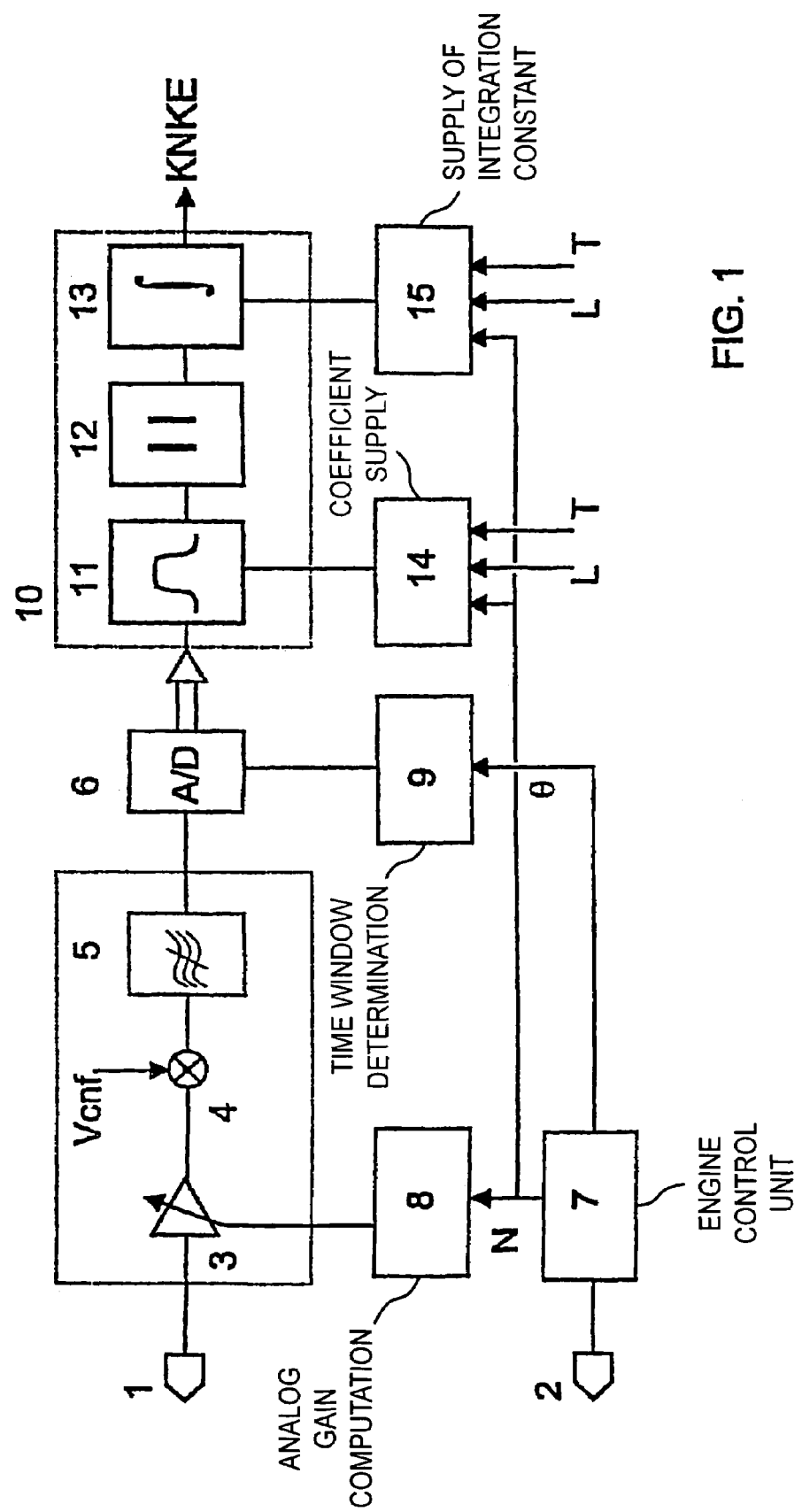
FIG. 1 is a schematic representation of the method according to the invention.

As is illustrated in FIG. 1, the analog signal delivered by the accelerometer 1 is amplified in an amplifier 3 with variable gain $G_A$, as a function of the engine rotation speed. The engine rotation is detected by means of a sensor 2 placed on the crankshaft. The rotation speed is deduced from information transmitted by the sensor 2 into a unit 7 (for example the engine control unit or ECU), then transmitted to a computation unit 8 that determines the analog gain $G_A$ of the amplifier 3 as a function of the rotation speed.

The gain $G_A$ is determined such that the signal output from the amplifier is substantially within the range −2.5 V to +2.5 V. This signal, shown in FIG. 2A, is added to a signal of constant value Vcnf, substantially equal to 2.5 V, in a summer 4, such that the signal output from the summer is either positive or zero, such as is illustrated in FIG. 2C.

Figures 2A, 2B, 2C:
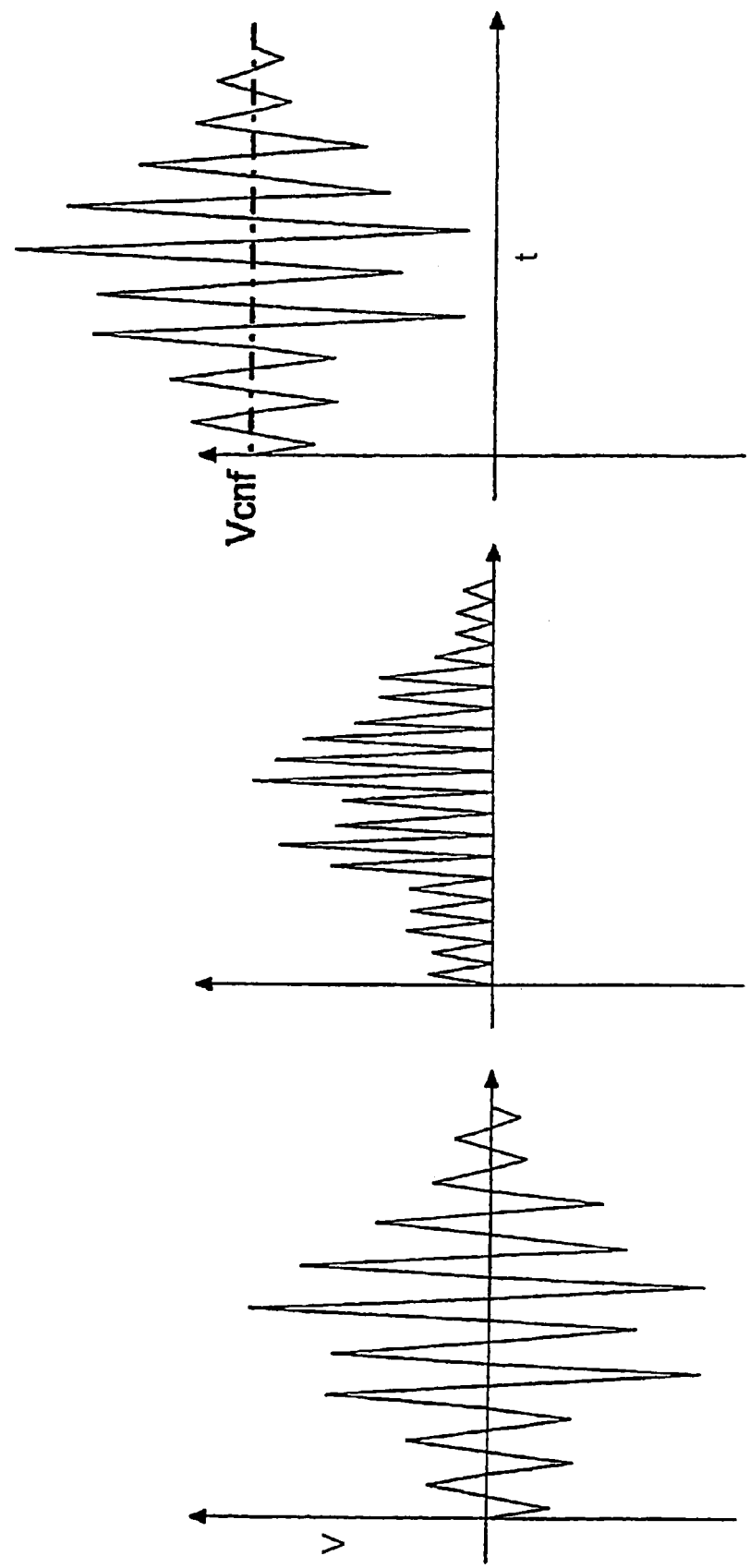
FIG. 2A is a representation of the analog signal supplied by the accelerometer.
FIG. 2B is a representation of the signal in FIG. 2A after conditioning according to a prior art technique.
FIG. 2C is a representation of the signal in FIG. 2A after conditioning according to the invention.

As is illustrated in FIG. 2B, the prior art technique consists in rectifying the signal by making the negative part positive and therefore modifies the characteristics of the signal: in particular, the main harmonic frequency of the original signal is doubled and additional harmonics are created. This is unacceptable because totally artificial additional frequencies will now appear and it is the spectral image of the signal that is used. If the latter is modified, the signal obtained is no longer representative of the observed phenomenon. It is this problem that is overcome with the method according to the invention that consists, at this stage, in adding the constant value Vcnf which does not modify the frequency nature of the spectrum.

It is then transformed into a digital signal in an analog-digital converter 6 after processing in an anti-aliasing filter 5 which eliminates all the frequencies higher than half the sampling frequency of the converter 6, according to Shannon's theorem. In practice, only the portion of the signal corresponding to the time window within which the information relating to the engine knock is the most prevalent is converted into digital samples. This time window is determined in a unit 9 as a function of information relating to the angular position θ of the crankshaft transmitted by the unit 7.

Furthermore, it will be noted that the signal input into the analog-digital converter 6 is advantageously in the range 0 V to +5 V, as long as the converters currently on the market offering the best quality/price ratio accept this range of values at their inputs.

The signal is subsequently input into a digital processing unit 10 successively comprising a bandpass filter 11, a rectifier 12 and an integrator 13.

The bandpass filter 11 is a Butterworth infinite impulse response filter whose transfer function comprises a zero for frequencies of zero and which is implemented by a biquadratic cell. It allows the component Vcnf, introduced in the summer 4, to be eliminated. The bandpass filter 11 is defined by a numerator (formed by the zeros) and a denominator (formed by the poles) in the form of a linear equation formed by the sum of samples with each of which is associated a coefficient $a_i$: $a_1$*current_sample+$a_2$*preceding_sample+ . . . +$a_n$*last_sample, where n is the number of samples.

The bandpass filter 11 comprises a 'zero at zero' allowing the DC component of the sampled signal to be eliminated and, since it is linear, the additional zero due to the DC component can be grouped together with the other natural zeros. For eliminating the DC component Vcnf, the bandpass filter is implemented in the order zeros then poles. Since the structure of the bandpass filter 11 is linear, it could however also have been implemented in the order poles then zeros, but the aforementioned advantage would not have been obtained. In order to halve the number of memory registers of the microprocessor, the calculation of the zeros and of the poles is carried out successively using the same memory registers of the microprocessor.

In addition, the coefficients are supplied by a unit 14 comprising a table of values that are functions of the rotation speed N of the engine transmitted by the unit 7, of the loading L and of the temperature T of the engine transmitted by supplementary sensors. This list of engine parameters taken into account is not exhaustive and may be broadened according to the degree of resolution desired in the processing.

Lastly, in order that the coefficients remain within a range of values in which the processor has a high enough precision, the coefficients are divided by an acquisition gain.

Subsequently, in order to obtain a representation of the energy relating to the engine knock, the filtered values are rectified in the rectifier 12. In practice, the register bit is standardized (eliminated in the case in question) over all of the values.

Then, the various values are added together in the integrator 13. However, in order to avoid phase shifting the signal, the penultimate value of the iterative summation (over the n samples) is added to the last value of this summation.

Finally, the result is multiplied by the acquisition gain and divided (or multiplied by its inverse) by an integration constant supplied by a unit 15 as a function of the retained engine parameters (the engine rotation speed N, the engine loading L and the engine temperature T in the present example). A value KNKE is then obtained that is representative of the knock state of the engine.

The invention claimed is:

1. A method for determining an energy (KNKE) of a knock of an internal combustion engine, of the type using an analog signal supplied by a sensor of engine knock rigidly attached to said engine, comprising steps of:
   a) conditioning of the analog signal,
   b) conversion of said analog signal into a sequence of digital samples,
   c) bandpass filtering of the signal,
   d) rectification of the signal and
   e) integration of the signal, in which method:
   i) the conditioning of the analog signal comprises the addition of said signal with a DC component ($V_{cnf}$) designed to render said conditioned signal positive or zero,
   ii) the digital filtering is carried out by means of a bandpass filter with infinite impulse response whose transfer function comprises a zero for frequencies of zero, and
   iii) outputting a signal whose valve is representative of a knock state of the engine.

2. The method as claimed in claim 1, characterized in that the conditioning of the analog signal also comprises an open-loop amplification of said signal with an analog gain ($G_A$) determined as a function of a rotation speed of the engine.

3. The method as claimed in claim 2, characterized in that the conditioning of the analog signal also comprises an anti-aliasing filter.

4. The method as claimed in claim 1, characterized in that the bandpass filter is in the form of a programmable biquadratic cell whose central frequency is defined as a function of operating conditions of the engine.

5. The method as claimed in claim 4, characterized in that a digital implementation of the bandpass filter is carried out by a two-step recursive expression, the first step leading to an intermediate variable representative of the calculation of the zeros of the filter, the second step providing the calculation of the poles.

6. The method as claimed in claim 4, characterized in that coefficients of the bandpass filter and/or other calculation parameters are taken from a table that was precalculated as a function of the operating conditions of the engine.

7. The method as claimed in claim 1, characterized in that the rectification step is carried out by elimination of a sign bit from a register containing a last filtered sample of the signal.

8. The method as claimed in claim 1, characterized in that the integration step is performed by means of a constant-phase digital integrator.

9. The method as claimed in claim 8, characterized in that the implementation of the integrator is carried out by a discrete summation of the filtered and rectified samples to produce a sum, to which a value of said sum at a penultimate sample is added.

* * * * *